(12) United States Patent
Sugaya et al.

(10) Patent No.: US 10,409,580 B2
(45) Date of Patent: Sep. 10, 2019

(54) IMAGE PROCESSING APPARATUS, METHOD, AND PROGRAM RECORDING MEDIUM

(71) Applicant: Konica Minolta, Inc., Tokyo (JP)

(72) Inventors: Takashi Sugaya, Toyokawa (JP); Jun Kunioka, Kawanishi (JP); Taketoshi Yamahata, Toyokawa (JP); Yusaku Tanaka, Ome (JP); Zhenhuan Qu, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 73 days.

(21) Appl. No.: 15/278,234

(22) Filed: Sep. 28, 2016

(65) Prior Publication Data
US 2017/0090905 A1 Mar. 30, 2017

(30) Foreign Application Priority Data

Sep. 29, 2015 (JP) ................................. 2015-191081

(51) Int. Cl.
*G06F 8/65* (2018.01)
*G06F 8/654* (2018.01)
(Continued)

(52) U.S. Cl.
CPC ................ *G06F 8/65* (2013.01); *G06F 8/654* (2018.02); *H04L 41/082* (2013.01); *H04L 67/34* (2013.01)

(58) Field of Classification Search
CPC . G06F 8/65; G06F 8/665; G06F 8/654; H04L 41/082; H04L 67/34
(Continued)

(56) References Cited

U.S. PATENT DOCUMENTS 6,151,709 A * 11/2000 Winkel ............... G06F 11/2294
717/173
6,588,010 B1 * 7/2003 Ogata ....................... G06F 8/60
717/169
(Continued)

FOREIGN PATENT DOCUMENTS

JP 2004185594 A * 7/2004
JP 2006-039848 A 2/2006
(Continued)

OTHER PUBLICATIONS

Porter et al., "A reconfigurable computing framework for multi-scale cellular image processing", 2006, Elsevier B.V. (Year: 2006).*
(Continued)

*Primary Examiner* — Wei Y Zhen
*Assistant Examiner* — Junchun Wu
(74) *Attorney, Agent, or Firm* — BakerHostetler

(57) ABSTRACT

An image processing apparatus includes a first storage area for storing firmware including a processing program for communication processing with an external terminal, and a processor. A processor starts execution of the processing program when a request to start the communication processing is received from the external terminal during execution of the firmware in the first storage area, and stores a modification program supplied into a second storage area when the modification program is received during execution of the processing program. The modification program is a modified program of at least a partial program in the processing program. The processor terminates execution of the processing program when a request to terminate the communication processing is received, and rewrites the processing program in the first storage area using the modification program in the second storage area when execution of the processing program is terminated.

20 Claims, 5 Drawing Sheets

(51) Int. Cl.
*H04L 12/24* (2006.01)
*H04L 29/08* (2006.01)

(58) Field of Classification Search
USPC .......................................................... 717/171
See application file for complete search history.

(56) References Cited

U.S. PATENT DOCUMENTS

| | | | | |
|---|---|---|---|---|
| 7,409,685 | B2* | 8/2008 | Chen .................... | G06F 8/65 717/170 |
| 7,886,287 | B1* | 2/2011 | Davda ................... | G06F 9/322 717/168 |
| 9,817,652 | B2* | 11/2017 | Choi ...................... | G06F 8/654 |
| 2002/0062479 | A1* | 5/2002 | Takata ................... | G06F 8/66 717/168 |
| 2002/0144250 | A1* | 10/2002 | Yen ....................... | G06F 8/65 717/168 |
| 2003/0035132 | A1* | 2/2003 | Tomita ................. | H04N 1/00204 358/1.14 |
| 2003/0035140 | A1* | 2/2003 | Tomita ................. | G06K 15/00 358/1.15 |
| 2003/0188304 | A1* | 10/2003 | Goodman ............. | G06F 8/656 717/171 |
| 2004/0185874 | A1* | 9/2004 | Kim ..................... | H04L 12/66 455/456.3 |
| 2005/0216904 | A1* | 9/2005 | Needham ............. | G06F 8/656 717/168 |
| 2008/0263540 | A1* | 10/2008 | Bando .................. | G06F 8/658 717/173 |
| 2010/0058322 | A1* | 3/2010 | Oikawa ................ | G06F 8/65 717/173 |
| 2010/0332905 | A1* | 12/2010 | Izumi ................... | G06F 11/3632 714/35 |
| 2012/0072897 | A1* | 3/2012 | Selvam ................ | G06F 8/66 717/171 |
| 2014/0047432 | A1* | 2/2014 | Michishita ............ | G06F 8/65 717/173 |
| 2014/0188984 | A1* | 7/2014 | Kouda .................. | H04L 67/1095 709/203 |

FOREIGN PATENT DOCUMENTS

| | | |
|---|---|---|
| JP | 2007-310783 A | 11/2007 |
| JP | 2010-198366 A | 9/2010 |
| JP | 2014-229140 A | 12/2014 |
| JP | 2016134117 A * | 7/2016 |

OTHER PUBLICATIONS

Bojinov et al., "Address Space Randomization for Mobile Devices", 2011, ACM (Year: 2011).*

Segal et al., "On-the-fly program modification: systems for dynamic updating", Mar. 1993, IEEE Software, vol. 10, Issue 2 (Year: 1993).*

Strobel et al., "Using Remote Update Controller of FPGA's as Built-in Self Test for Embedded Systems", 2013, IEEE (Year: 2013).*

* cited by examiner

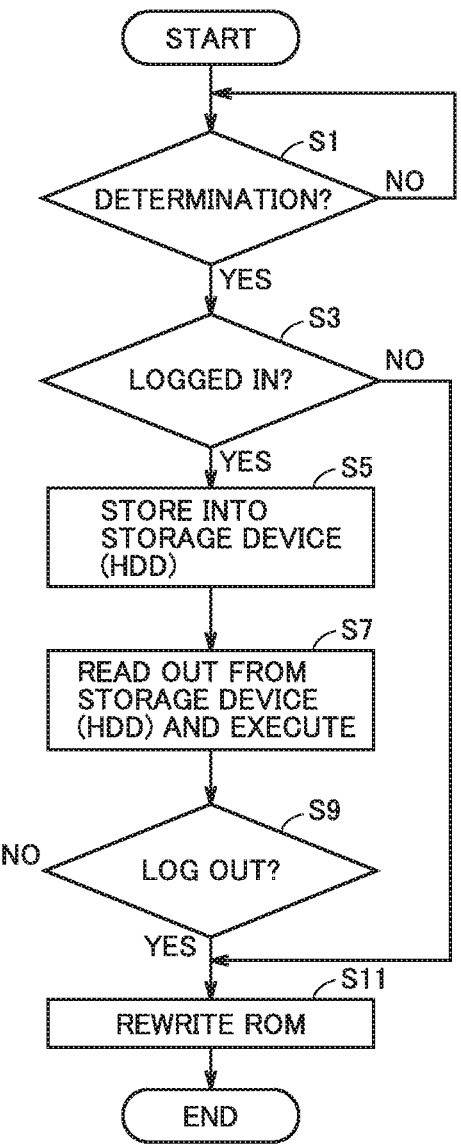

IMAGE PROCESSING APPARATUS, METHOD, AND PROGRAM RECORDING MEDIUM

This application claims priority to Japanese Patent Application No. 2015-191081 filed with the Japan Patent Office on Sep. 29, 2015, the entire content of which is hereby incorporated by reference.

BACKGROUND OF THE INVENTION

Field of the Invention

The present disclosure relates to an image processing apparatus, a method, and a program recording medium, and more particularly to an image processing apparatus having the function of updating firmware, a method of carrying out the updating, and a program recording medium.

Description of the Related Art

Image processing apparatuses used in offices (for example, copiers, printers, and MFPs (Multi-Function Peripherals) that combine those functions) communicate with a user's computer through an intranet or other networks. The user's computer generally has a World Wide Web (hereinafter abbreviated as Web) browser, and the image processing apparatus includes a Web page creator implemented by an application program that creates a Web page compatible with the computer's Web browser. When receiving an inquiry for information (for example, information indicating the state of the image processing apparatus) from the computer's Web browser, the Web page creator creates a Web page based on the inquiry and transmits the created Web page to the computer. The computer's Web browser receives the Web page and displays an image based on the received Web page on the display.

The computer's Web browser is updated due to addition of a new function. In such a case, the Web page creator of the image processing apparatus need to be updated so as to create a new Web page compatible with the updated Web browser.

The application program of the Web page creator is generally included in the firmware of the image processing apparatus. Therefore, when the Web page creator is updated, it is necessary to update the firmware. Unfortunately, during updating of the firmware, the user is unable to use the image processing apparatus. The reason for this is that the image processing apparatus need to re-expand the updated firmware into a RAM (Random Access Memory), and the running application program should be stopped for the purpose of the re-expansion.

In order to avoid this problem, a part of the application program (module) to be changed (changed part) is stored into an HDD (Hard Disc Drive), and the unchanged part is stored separately into a ROM, whereby the changed part in the HDD alone can be updated with a module acquired by accessing an application store from the Web browser, without updating the firmware.

Since the rate of access to the HDD is lower than to the ROM, it takes time to expand the changed part from the HDD to the RAM at start-up of the MFP. In addition, a wait time for HDD initialization occurs. For these reasons, the application program is slow to start up. Meanwhile, the user is unable to use the application program. In such a case, when the user is remotely accessing the MFP by operating an external terminal, the MFP does not transmit a notification of the state of the MFP to the external terminal. This makes the user feel stress in the wait time resulting from the slow start-up.

During start-up of the MFP, the changed part of the application program is unable to be expanded from the ROM into the RAM. For this reason, the changed part is stored in the HDD in advance, and after a request is received from the Web browser of the user's external terminal, the MFP reads out the changed part from the HDD and transmits a response to the Web browser based on the read changed part. The Web browser performs rendering based on the received response to display a screen of a Web page. In this case, it takes time to access the HDD, thereby deteriorating the performance from the request to the screen showing up. In addition, since the user's external terminal and the MFP communicate with each other via a network, network communication takes place every request/response, and the wait time further increases by the length of the communication time. As a result, the user feels stress as described above.

In order to avoid such reduction in user convenience, for example, Japanese Laid-Open Patent Publication No. 2014-229140 proposes a method of replacing a language file without updating firmware. For example, Japanese Laid-Open Patent Publication No. 2007-310783 proposes a method of automatically updating firmware data when a device inactive state is selected.

SUMMARY OF THE INVENTION

The replacement of a language file according to Japanese Laid-Open Patent Publication No. 2014-229140 is inconvenient because it is implemented manually. The updating of firmware data according to Japanese Laid-Open Patent Publication No. 2007-310783 is inconvenient because it requires the operation of setting the device into an inactive state (power-saving mode, sleep mode). It is also inconvenient in that the user is unable to use new firmware data until the updating of firmware data is completed in a device inactive state.

An object of the present disclosure is to improve user convenience when firmware including a program for communication processing with an external terminal is updated.

According to an aspect of the present disclosure, an image processing apparatus includes a first storage area for storing firmware including a processing program for communication processing with an external terminal, and a processor. The processor is configured to start execution of the processing program when a request to start the communication processing is received from the external terminal during execution of the firmware in the first storage area, store a modification program supplied into a second storage area when the modification program is received during execution of the processing program. The modification program is a modified program of at least a partial program in the processing program. The processor terminates execution of the processing program when a request to terminate the communication processing is received, and rewrites the processing program in the first storage area using the modification program in the second storage area when execution of the processing program is terminated.

Preferably, the image processing apparatus further includes a third storage area. The processor is further configured to read out the firmware including the processing program from the first storage area to the third storage area and execute the read firmware, associate an address in the second storage area at which the modification program of the partial program is stored with an address in the third storage area of the partial program in the processing program, and when the partial program in the processing program is executed, execute the modified program stored at the address in the second storage area associated with the address in the third storage area to which the partial program is read out, in place of the partial program.

Preferably, the modification program is supplied from a server that distributes the modification program, and the processor is further configured to receive the modification program in response to receiving a request from the server.

Preferably, the external terminal is capable of communicating with the server, and the processor is further configured to receive the modification program from the server via the external terminal.

Preferably, the processor is further configured to acquire timing information indicating a timing at which updating of the firmware is scheduled, and to prohibit receiving of the modification program from the server via the external terminal when the acquired timing information indicates latest schedule.

Preferably, the second storage area includes an area within a storage device detachable from the image processing apparatus and capable of storing the processing program. The processor is further configured to rewrite the processing program in the first storage area using the modification program in the storage device on termination of execution of the processing program, when the storage device is attached to the image processing apparatus during execution of the processing program.

According to another aspect of the present disclosure, computer-implemented method is provided. The computer includes a first storage area configured to store firmware including a processing program for communication processing with an external terminal. The method includes executing the processing program. The executing includes starting execution of the processing program when a request to start the communication processing is received from the external terminal during execution of the firmware in the first storage area; storing a modification program into a second storage area when the modification program is received during execution of the processing program, the modification program being a modified program of at least a partial program in the processing program; terminating execution of the processing program when a request to terminate the communication processing is received; and rewriting the processing program in the first storage area using the modification program in the second storage area when execution of the processing program is terminated.

Preferably, the method further includes reading out the firmware including the processing program from the first storage area to a third storage area and executing the read firmware, associating an address at which the modification program of the partial program is stored in the second storage area with an address in the third storage area of the partial program in the processing program read in the reading, and when the partial program in the processing program is executed, executing the modified program stored at the address in the second storage area associated with the address in the third storage area to which the partial program is read out, in place of the partial program.

Preferably, the modification program is supplied from a server that distributes the modification program. The method further includes receiving the modification program from the server in response to receive a request from the server Preferably, the external terminal is capable of communicating with the server, and the method further includes receiving the modification program from the server via the external terminal.

Preferably, the method further includes acquiring timing information indicating a timing when updating of the firmware is scheduled and prohibiting reception of the modification program from the server via the external terminal when the timing information indicates latest schedule.

Preferably, the second storage area includes a area within a storage device detachable from the computer and capable of storing the processing program. The method further includes rewriting the processing program in the first storage area using the modification program in the storage device on termination of execution of the processing program, when the storage device is attached to the computer during execution of the processing program.

According to yet another aspect of the present disclosure, a non-transitory computer-readable storage medium storing a program for causing a computer to execute a method is provided. The computer includes a first storage area configured to store firmware including a processing program for communication processing with an external terminal. The method includes executing the processing program. The executing includes starting execution of the processing program when a request to start the communication processing is received from the external terminal during execution of the firmware in the first storage area, storing a modification program into a second storage area when the modification program is received during execution of the processing program, the modification program being a modified program of at least a partial program in the processing program, terminating execution of the processing program when a request to terminate the communication processing is received, and rewriting the processing program in the first storage area using the modification program in the second storage area when execution of the processing program is terminated.

Preferably, the method further includes reading out the firmware including the processing program from the first storage area to a third storage area and executing the read firmware, associating an address at which the modification program of the partial program is stored in the second storage area with an address in the third storage area of the partial program in the processing program read in the reading, and when the partial program in the processing program is executed, executing the modified program stored at the address in the second storage area associated with the address in the third storage area to which the partial program is read out, in place of the partial program.

Preferably, the modification program is supplied from a server that distributes the modification program. The method further includes receiving the modification program from the server in response to receiving a request from the server.

Preferably, the external terminal is capable of communicating with the server, and the method further includes receiving the modification program from the server via the external terminal.

Preferably, the method further includes acquiring timing information indicating a timing when updating of the firmware is scheduled; and prohibiting reception of the modification program from the server via the external terminal when the timing information indicates latest schedule.

Preferably, the second storage area includes a area within a storage device detachable from the computer and capable of storing the processing program. The method further includes rewriting the processing program in the first storage area using the modification program in the storage device on termination of execution of the processing program, when the storage device is attached to the computer during execution of the processing program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart of the processing according to the first embodiment.

DESCRIPTION OF THE PREFERRED EMBODIMENTS

Embodiments of the present invention will be described below with reference to the drawings. In the following description, the same parts and components are denoted with the same reference signs. Their names and functions are also the same.

A technical concept according to the present embodiment is as follows. An image processing apparatus stores firmware including a processing program for communication processing with an external terminal in a first storage unit. The image processing apparatus determines whether a modified program, which is at least a partial program in the processing program (modification program), is to be supplied to the image processing apparatus. When the image processing apparatus receives a request to start communication processing (request to start a communication session, for example, login request) from an external terminal during execution of the firmware in the first storage unit, the image processing apparatus starts execution of the processing program in the firmware and subsequently terminates execution of the processing program when receiving a request to terminate the communication processing (a request to terminate the communication session, for example, logout request).

When it is determined that the modification program is to be supplied to the apparatus during execution of the processing program, the image processing apparatus temporarily stores the supplied modification program into a second storage unit. Subsequently, when execution of the processing program is finished, the image processing apparatus rewrites the processing program in the first storage unit using the modification program in the second storage unit.

The image processing apparatus thus automatically rewrites the processing program in the firmware with the modified program when the communication processing with an external terminal is terminated. Therefore, at the next start-up of the image processing apparatus, it is only necessary to start the firmware in first storage unit including the processing program after completion of rewriting. This eliminates the need for the image processing apparatus to access the second storage unit at start-up and thereby reduces the user's waiting time for start-up. In addition, this rewriting of the processing program does not require the user operation for setting the image processing apparatus into a special activate state (power-saving mode, sleep mode). This approach enables the processing program and the firmware including the same to be rewritten conveniently.

First Embodiment

System Configuration

Figure 1:
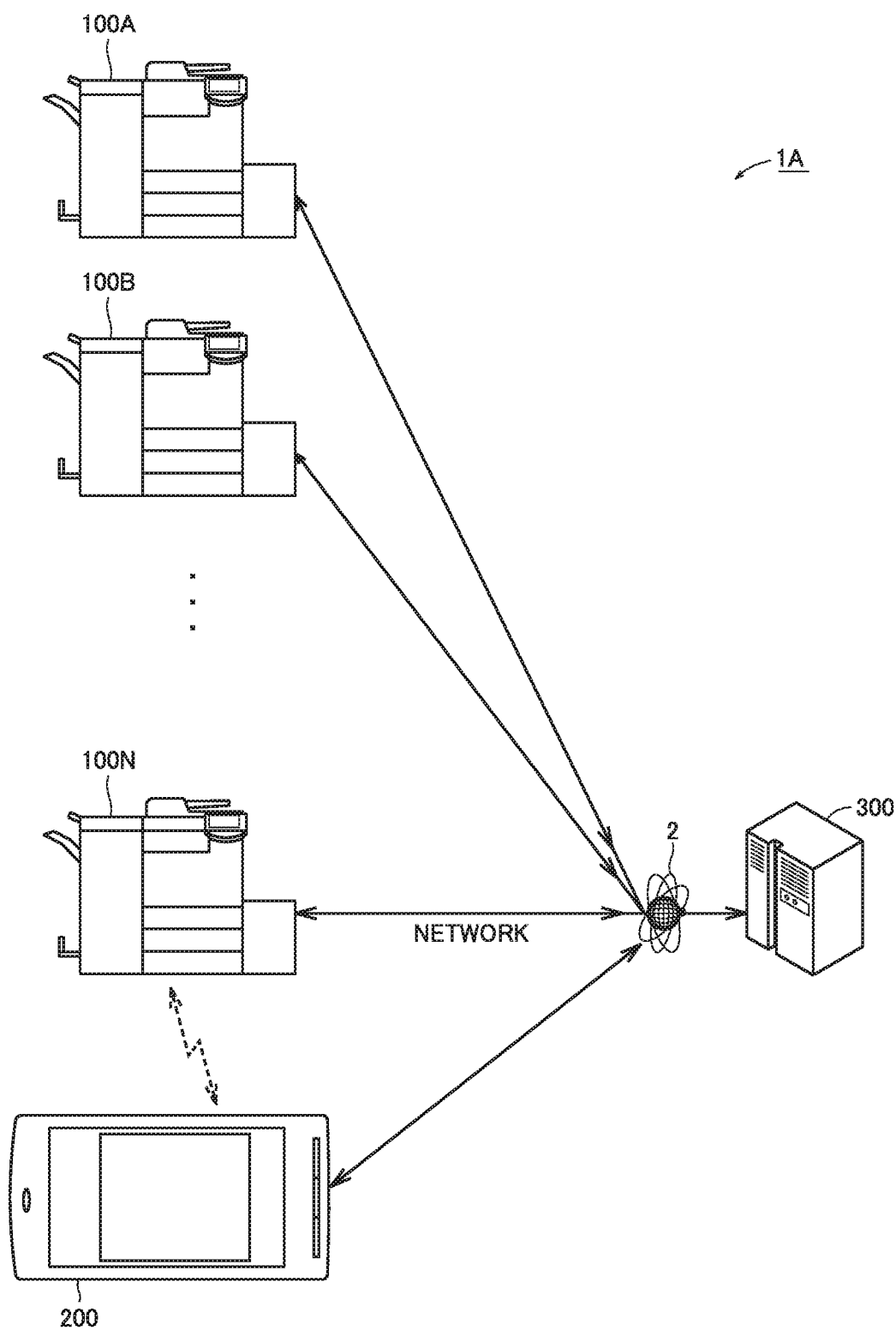
FIG. 1 is a diagram showing a specific example of the configuration of an image processing system according to a first embodiment.

FIG. 1 is a diagram showing a specific example of the configuration of an image processing system according to a first embodiment. Referring to FIG. 1, an image processing system IA includes a plurality of MFPs (Multi-Function Peripherals) 100A. 100B, . . . 100N serving as image processing apparatuses, a mobile terminal 200, and a server 300). It is noted that MFPs 100A, 100B, . . . 100N are collectively referred to as MFP 100.

The image processing apparatus is not limited to an MFP and may be any apparatus that has at least one or more image processing functions, such as a printer, a facsimile transmitter/receiver, a copier, or any other devices. MFP 100 is an image processing apparatus that combines these functions.

Mobile terminal 200 is an example of the external terminal that the image processing apparatus communicates with. Although mobile terminal 200 has been illustrated as the external terminal here, mobile terminal 200 may not be portable but may be a stand-alone information processing terminal that has functions at least including the instruction input function, the display function, and the communication function. Server 300 is a general computer.

MFP 100, mobile terminal 200, and server 300 can mutually communicate through a communication network 2 including the Internet. Communication between MFP 100 and mobile terminal 200 may use a company intranet. Communication network 2 and the intranet include a variety of wired and wireless communication networks.

<Configuration of MFP>

Figure 2:
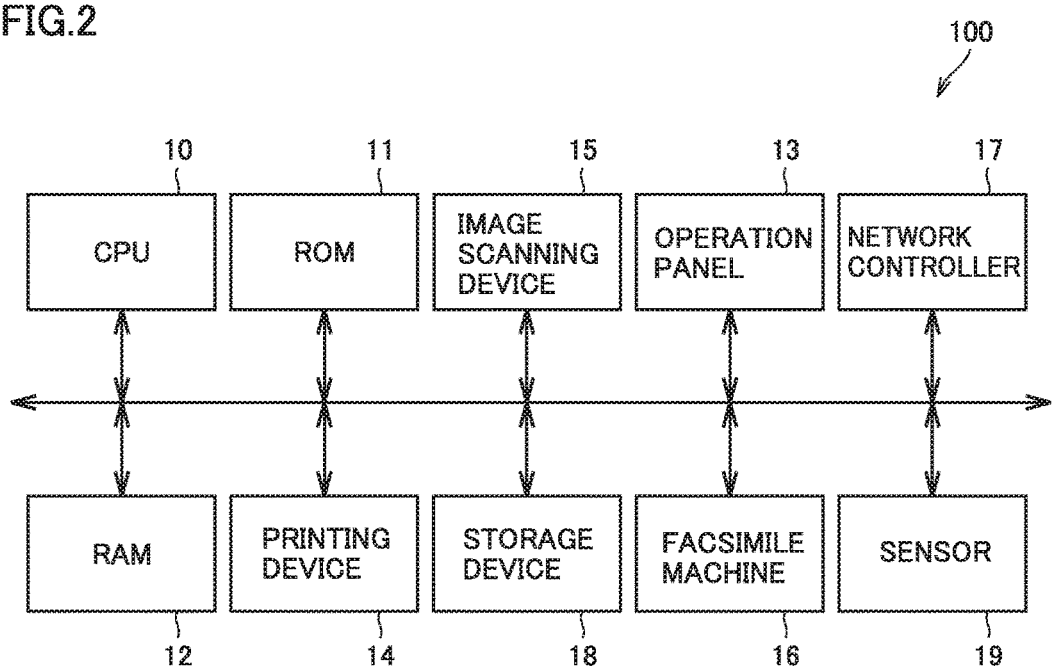
FIG. 2 is a diagram showing a specific example of the hardware configuration of an MFP according to the first embodiment.

FIG. 2 is a diagram showing a specific example of the hardware configuration of MFP 100 according to the first embodiment. Referring to FIG. 2, MFP 100 includes a CPU (Central Processing Unit) 10, which corresponds to a control unit for controlling the entire MFP, a ROM (Read Only Memory) 11 for storing programs executed in CPU 10 and data, and a RAM (Random Access Memory) 12 functioning as a working area when a program is executed in CPU 10. MFP 100 further includes an image scanning device 15 for optically reading a document placed on a not-shown stage to obtain image data, a printing device 14 for fixing image data on print paper, an operation panel 13 including a touch panel for displaying information and accepting operation input to MFP 100, a facsimile machine 16, a network controller 17 having a communication circuit including a modem for controlling communication with an external terminal (mobile terminal 200, server 300), a storage device 18, and a sensor 19. Storage device 18 has a hard disk storage device. Sensor 19 includes, for example, a sensor for detecting a toner level, a sensor for detecting jams at various parts (paper jams) and abnormal operations, and a counter for counting copy volume, scan volume, print volume, and others.

<Configuration of Mobile Terminal>

Figure 3:
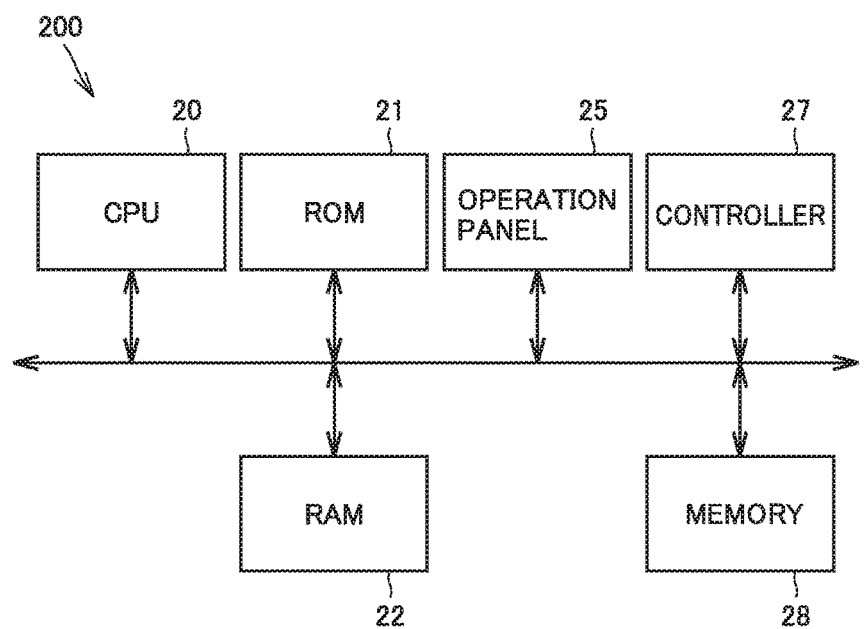
FIG. 3 is a diagram showing a specific example of the hardware configuration of a mobile terminal according to the first embodiment.

FIG. 3 is a diagram showing a specific example of the hardware configuration of mobile terminal 200 according to the first embodiment. Referring to FIG. 3, mobile terminal 200 includes a CPU 20 for overall control, a ROM 21 for storing programs executed in CPU 20 and data, a RAM 22 functioning as a working area when a program is executed in CPU 20, an operation panel 25 including a touch panel for displaying information and accepting operation input to mobile terminal 200, a controller 27 for controlling communication, and a memory 28 for storing programs and data.

<Configuration of Server>

Figure 4:
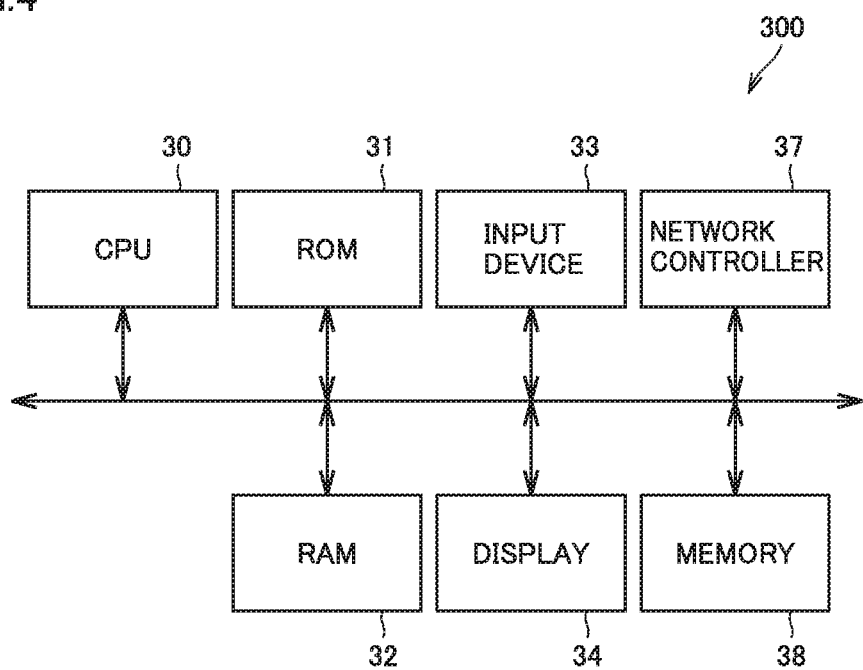
FIG. 4 is a diagram showing a specific example of the hardware configuration of a server according to the first embodiment.

FIG. 4 is a diagram showing a specific example of the hardware configuration of server 300 according to the first embodiment. Referring to FIG. 4, server 300 includes a CPU 30 for overall control, a ROM 31 for storing programs executed in CPU 30 and data, a RAM 32 functioning as a working area when a program is executed in CPU 30, an input device 33, a display 34 for displaying information, a network controller 37 for controlling communication through communication network 2, and a memory 38 such as a hard disk storage device.

<Functional Configuration>

Figure 5:
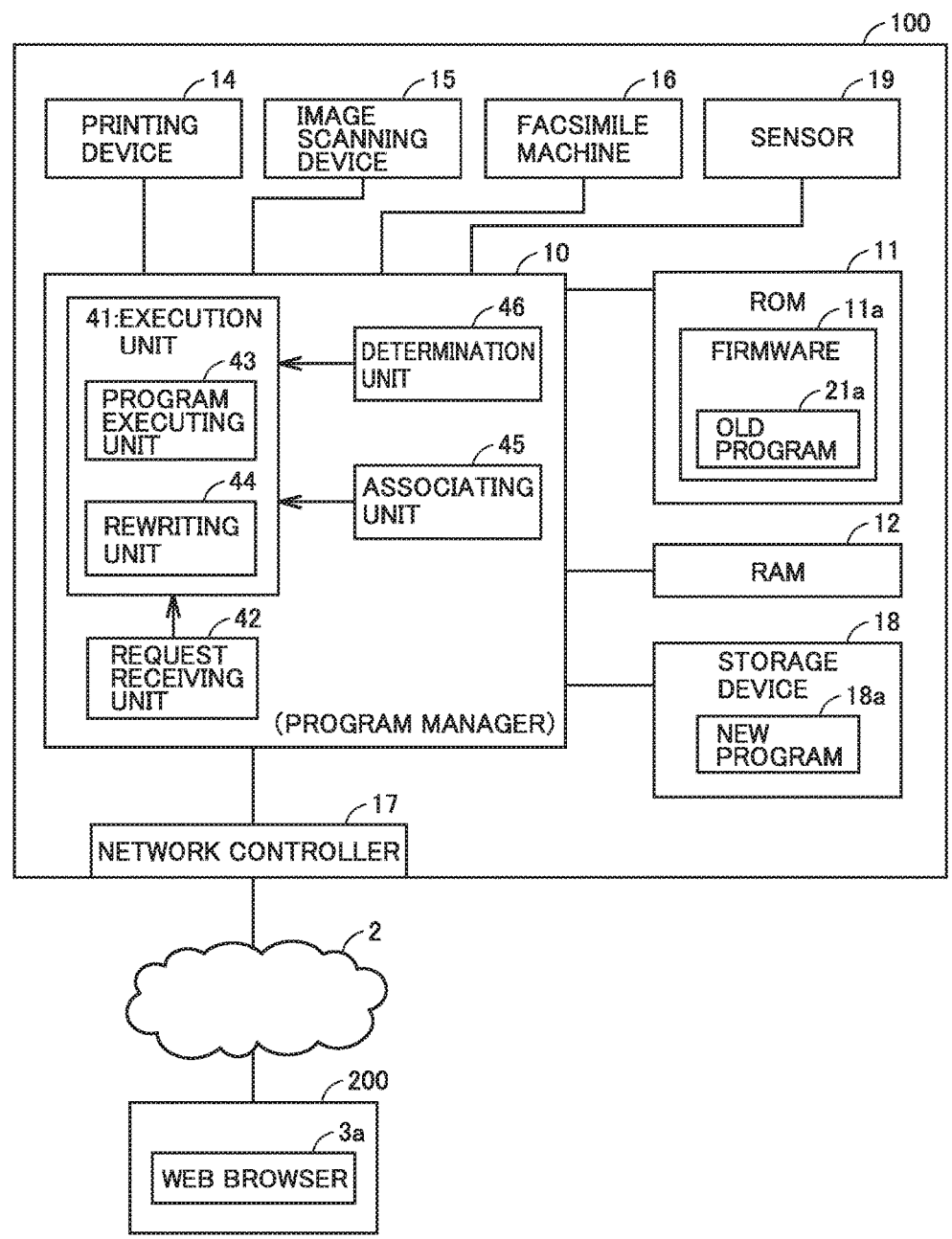
FIG. 5 is a diagram schematically showing the functional configuration of the MFP according to the first embodiment.

FIG. 5 is a diagram schematically showing the functional configuration of the MFP according to the first embodiment. FIG. 5 shows the functions of the CPU 10 for rewriting the firmware in ROM 11, in connection with peripheral devices. Mobile terminal 200 receives a World Wide Web (hereinafter abbreviated as Web) page from server 300 and MFP 100 through communication network 2. A Web page is information for displaying an image that is written, for example, in HTML (HyperText Markup Language). Web browser 3*a* of mobile terminal 200 generates image data by rendering based on the received Web page and drives the display of operation panel 25 based on the generated image data. The image of the Web page thus appears on the display.

Firmware 11*a* including a program and data for controlling the hardware in the apparatus is stored in ROM 21 of MFP 100. CPU 10 includes an execution unit 41 that reads out firmware 11*a* from ROM 21 to RAM 12 to execute the read firmware 11*a*, a request receiving unit 42, an associating unit 45 that associates addresses, and a determination unit 46 for determining whether a new program 18*a* described later is to be supplied to MFP 100. Execution unit 41 includes a program executing unit 43 that executes a program for communication processing between Web browser 3*a* of mobile terminal 100 and the Web server of MFP 100, and a rewriting unit 44 that rewrites an old program 21*a* in ROM 11 using new program 18*a* in storage device 18, for example, by overwriting.

ROM 11 corresponds to an embodiment of the first storage area, storage device 18 corresponds to an embodiment of the second storage area, and RAM 12 corresponds to an embodiment of the third storage area. Although the different first to third storage areas are provided in separate storage devices, the embodiments are not limited thereto. For example, the first storage area and the third storage area may be provided in different areas within ROM 11.

Firmware 11*a* includes old program 21*a*. Old program 21*a* is a program including an executable file and data and has both of the function of a Web page generator for generating a Web page and the function of a Web server. The Web page generator acquires information representing a state of MFP 100 based on output of sensor 19 and generates a Web page from the acquired information. The Web server performs communication with an external terminal including mobile terminal 200 in accordance with HTTP (Hypertext Transfer Protocol) using network controller 17. Old program 21*a* is an embodiment of the processing program for communication processing with mobile terminal 200.

In storage device 18, new program 18*a*, which is the modified old program due to upgrading of old program 21*a*, is stored. Although new program 18*a* is illustrated here as a modification to the entire old program 21*a*, new program 18*a* may be a modification to at least a partial program in old program 21*a*.

The functions of the units of CPU 10 in FIG. 5 are realized by executing the programs stored in ROM 11. CPU 10 reads out these programs from ROM 11 and executes the read programs, thereby implementing the functions of the units. CPU 10 is an embodiment of the program manager that manages a program in MFP 100.

Request receiving unit 42 receives a variety of requests from external terminals including mobile terminal 200 through network controller 17. Execution unit 41 reads out firmware 11*a* from ROM 11 to RAM 12 and executes a variety of programs of firmware 11*a* read out to RAM 12.

Here, the requests received by request receiving unit 42 include a login request for requesting start of a communication session with the Web server, a logout request for requesting termination of the communication session, and a request to acquire data in a Web page. The login request corresponds to a request to start execution of a processing program (corresponding to old program 21*a* or new program 18*a*) for communication processing, and the logout request corresponds to a request to terminate execution of the processing program. The request to acquire data in a Web page includes the URL (Uniform Resource Locator) of the data.

When the request to start is received during execution of firmware 11*a* by execution unit 41, program executing unit 43 reads out new program 18*a* from storage device 18 and starts execution of the read new program 18*a* in place of old program 21*a* read out to RAM 12. When request receiving unit 42 receives a request to terminate during execution of new program 18*a* by program executing unit 43, rewriting unit 44 reads out new program 18*a* from storage device 18 and rewrites old program 21*a* in ROM 21 using the read new program 18*a*.

FIG. 6 is a flowchart of the rewriting of old program 21*a* in ROM 21 according to the first embodiment. A program of the processing flowchart in FIG. 6 is stored beforehand in ROM 21. CPU 10 reads out the program from ROM 21 and executes the program to implement the processing in FIG. 6.

Here, it is assumed that firmware 11*a* including old program 21*a* is stored in ROM 21. Mobile terminal 200 or server 300 supplies new program 18*a* to MFP 100. For this supply, mobile terminal 200 or server 300 transmits a request for transmission (or supply) to MFP 100. When receiving a response (Acknowledgement) to the request from MFP 100, mobile terminal 200 or server 300 transmits (uploads or downloads) new program 18*a* to MFP 100. New program 18*a* is thus supplied to MFP 100.

Referring to FIG. 6, first of all, after start-up of MFP 100, CPU 10 executes firmware 11*a*. During execution of firmware 11*a*, determination unit 46 determines whether new program 18*a* is to be supplied to MFP 100, based on whether a request to transmit new program 18*a* is received from mobile terminal 200 or server 300 (step S1). While it is determined that no new program 18*a* is to be supplied (NO in step S1), the subsequent processing for program rewriting is not performed, and the processing in step S1 is repeated.

When determination unit 46 determines that new program 18*a* is to be supplied (YES in step S1), CPU 10 determines whether mobile terminal 200 is logged in to the Web server (step S3). That is, CPU 10 determines whether a login request has been received by request receiving unit 42 and then old program 21*a* has been read out from ROM 11 to RAM 12 and is running.

If CPU 10 determines that mobile terminal 200 is logged in and old program 21a is running (YES in step S3), the process proceeds to step S5 described later. On the other hand, if CPU 10 determines that mobile terminal 200 is not logged in and old program 21a is not running (NO in step S3), CPU 10 transmits a response (Acknowledgement) to the request to transmit received in step S1 and receives new program 18a transmitted from mobile terminal 200 or server 300 in response to the response.

Rewriting unit 44 overwrites old program 21a in ROM 21 with the received new program 18a and thereby rewrites old program 21a to new program 18a (step S11). The process then ends.

On the other hand, if it is determined that mobile terminal 200 is logged in (YES in step S3), CPU 10 receives new program 18a transmitted from mobile terminal 200 or server 300 in response to the response (Acknowledgement) and stores the received new program 18a into an area at a predetermined address in storage device 18 (step S5).

When new program 18a is stored into a predetermined area in storage device 18, program executing unit 43 of execution unit 41 reads out new program 18a from storage device 18 to RAM 12 and executes the read new program 18a in place of old program 21a read out to RAM 12 (step S7).

The processing of associating unit 45 for executing new program 18a in place of old program 21a in step S7 will now be described. When new program 18a is stored into a predetermined area in storage device 18, associating unit 45 acquires, from program executing unit 43, the address in RAM 12 of old program 21a read out from ROM 11 to RAM 12 by program executing unit 43. Associating unit 45 associates the acquired address with the address of the predetermined area in which new program 18a is stored in storage device 18, and stores associative information indicating this association into RAM 12. This association is carried out, for example, by referring to a translation table for translating a virtual address of storage device 18 into a physical address of RAM 12. The translation table is information created by the OS (Operating System) using a well-known technique, and a detailed description thereof will not be repeated.

To execute a program code of old program 21a, program executing unit 43 translates the address of the program code into the address in storage device 18, based on the associative information. Program executing unit 43 reads out the program code of new program 18a from the area at the address in storage device 18 obtained through the translation and executes the read program code. Program execution unit 43 thus can execute new program 18a in place of old program 21a.

In this manner, the reference (readout) source of program codes for the Web server and the Web page creator included in the firmware 11a is switched from old program 21a to new program 18a in storage device 18, whereby a Web page can be generated by new program 18a, and the generated Web page can be transmitted to mobile terminal 200. Web browser 3a of mobile terminal 200 receives the Web page generated by new program 18a and displays an image based on the received Web page.

CPU 10 determines whether mobile terminal 200 has logged out of the Web server (step S9). That is, it is determined whether request receiving unit 42 has received a logout request.

If CPU 10 determines that mobile terminal 200 has not logged out (that is, logged in) (NO in step S9), the process returns to step S7, and the subsequent processing is performed similarly.

On the other hand, if CPU 10 determines that mobile terminal 200 has logged out (YES in step S9), rewriting unit 44 reads out, from storage device 18, new program 18a received from mobile terminal 200 or server 300 and stored in storage device 18 and, for example, overwrites old program 21a in ROM 21 with the read new program 18a (step S11). Rewriting unit 44 thus can rewrite old program 21a in ROM 11 to new program 18a. The process then ends.

According to the first embodiment, when logout is determined, that is, when communication processing between MFP 100 and mobile terminal 200 is terminated, old program 21a in ROM 11 is rewritten to new program 18a. Since old program 21a is a partial program of firmware 11a, rewriting old program 21a takes shorter time (for example, about 10 seconds) than the time required for rewriting the entire firmware 11a (for example, 10 minutes), thereby reducing the effects on the user caused by the wait for rewriting.

The rewriting of the program does not require user's special operation for rewriting, because the rewriting is automatically started when Web browser 3a of mobile terminal 200 logs out of the Web server of MFP 100 (when communication processing is terminated).

At start-up of MFP 100 after rewriting, firmware 11a including new program 18a in ROM 11 is activated. That is, at start-up, CPU 10 accesses ROM 11 alone and need not access other storage devices (for example, storage device 18), so that MFP 100 can be started promptly.

Modifications of the first embodiment will now be described.

[First Modification]

In a first modification, new program 18a described in the first embodiment is distributed, for example, in a file format from server 300. Specifically, the Web server transmits update instruction codes (for example, JavaScript (registered trademark)) to Web browser 3a of mobile terminal 200. Web browser 3a receives the file containing new program 18a from server 300 and uploads the received file (new program 18a) to MFP 100 in accordance with the received update instruction codes.

[Second Modification]

In a second modification, when rewriting with new program 18a is carried out by the aforementioned uploading by the Web browser 3a of mobile terminal 200, MFP 100 refers to timing information indicating the timing when updating of firmware 11a is scheduled. Specifically, CPU 10 receives this timing information through communication network 2 or acquires it through user's operation on operation panel 13. CPU 10 then compares the timing information with the present time measured by a timer (not shown) and, if it is determined that the timing information indicates the latest schedule (for example, within days) based on the comparison result, prohibits supply of new program 18a from server 300 to MFP 100 via mobile terminal 200.

For example, CPU 10 can prohibit supply of new program 18a from mobile terminal 200 to MFP 100 by transmitting NACK (Negative Acknowledgement) to mobile terminal 200 in place of Acknowledgement.

This can reschedule the start timing of rewriting old program 21a with new program 18a when updating of firmware 11a is scheduled within days.

[Third Modification]

A third modification is a modification to the foregoing first embodiment. A storage device attachable to and removable from MFP 100, such as a USB (Universal Serial Bus) memory, can be used as storage device 18 for storing new program 18*a*. CPU 10 starts the processing subsequent to step S3 in FIG. 6 when it is detected that the storage device is attached to MFP 100. In this case, new program 18*a* in the storage device attached to MFP 100) is referred to in place of new program 18*a* in storage device 18 described in the first and second embodiments. Old program 21*a* is rewritten using new program 18*a* read out from the attached storage device.

[Fourth Modification]

A fourth modification is a modification to the foregoing first embodiment. Another method for supplying new program 18*a* to MFP 100 may be as follows. When MFP 100 communicates with server 300 through communication network 2, MFP 100 downloads new program 18*a* from server 300. When mobile terminal 200 is connecting to the Internet of communication network 2, Web browser 3*a* receives new program 18*a* from server 300 and uploads the received new program 18*a* to MFP 100. The user can select one of the methods (download or upload) through the operation of operation panel 13.

[Fifth Modification]

In the example above, MFP 100 carries out the rewriting of old program 21*a* when mobile terminal 200 logs out. However, the timing is not limited to the logout timing. For example, the rewriting may be carried out at any time when communication processing by Web browser 3*a* and the Web server of MFP 100 is not carried out, that is, when old program 21*a* is not activated (executed).

According to the embodiments, user convenience can be improved in updating of the firmware including a program for communication processing of MFP 100 with an external terminal.

Second Embodiment

In a second embodiment, a program for allowing MFP 100 to execute the operation described above is provided. Such a program is stored in a storage device supplied with the computer of MFP 100. The storage device is, for example, a computer (such as CPU 10)-readable recording medium. More specifically, examples of the storage device include nonvolatile data storage media such as CD-ROM (Compact Disc-Read Only Memory), DVD-ROM (Digital Versatile Disk-Read Only Memory), USB (Universal Serial Bus) memory, memory cards, FD (Flexible Disk), hard disks, SSD (Solid State Drive), magnetic tapes, cassette tapes, MO (Magnetic Optical Disc), MD (Mini Disc), IC (Integrated Circuit) cards (excluding memory cards), optical cards, mask ROM, EPROM, and EEPROM (Electronically Erasable Programmable Read-Only Memory). A program downloaded through a network may be installed in the storage device.

The program may invoke necessary modules of program modules provided as part of the OS of a computer, in a predetermined sequence at a predetermined timing, to execute the processing. In this case, the program itself does not include the modules and cooperates with the OS to execute the processing. The program of the second embodiment may include such a program that does not include modules.

The program according to the second embodiment may be provided in the form of a program built in part of another program. Also in this case, the program itself does not include modules included in another program and cooperates with another program to execute the processing. The program according to the present second embodiment may also include such a program built in another program.

The provided program product is installed into a program storage such as a hard disk for execution. The program product includes a program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a first storage area configured to store firmware including a processing program for communication processing with an external terminal, a third storage area, and a processor,
wherein the processor is configured to:
read out the firmware including the processing program from the first storage area to the third storage area and execute the read firmware;
receive a login request from the external terminal to establish a communication session, wherein the login request is received during execution of the firmware;
start execution of the processing program in response to the login request,
receive a modification program and store the modification program into a second storage area when the modification program is received during execution of the processing program, the modification program being a modified program of at least a partial program in the processing program,
associate an address in the second storage area at which the modification program is stored with an address in the third storage area of the processing program;
execute the modified program stored at the address in the second storage area associated with the address in the third storage area to which the processing program is read out, in place of the processing program;
terminate execution of the processing program when a logout request to terminate the communication session is received, and
rewrite the processing program in the first storage area using the modification program in the second storage area when execution of the processing program is terminated in response to the received logout request to terminate.

2. The image processing apparatus according to claim 1, wherein the modified program is executed, in place of the partial program, when the partial program in the processing program is executed.

3. The image processing apparatus according to claim 1, wherein the modification program is supplied from a server that distributes the modification program, and the processor is further configured to receive the modification program in response to receiving a request from the server.

4. The image processing apparatus according to claim 3, wherein
the external terminal is capable of communicating with the server, and
the processor is further configured to receive the modification program from the server via the external terminal.

5. The image processing apparatus according to claim 4, wherein
the processor is further configured to acquire timing information indicating a timing at which updating of the firmware is scheduled, and to prohibit receiving of the modification program from the server via the external terminal when the acquired timing information indicates latest schedule.

6. The image processing apparatus according to claim 1, wherein
the second storage area includes an area within a storage device detachable from the image processing apparatus and capable of storing the processing program, and
the processor is further configured to rewrite the processing program in the first storage area using the modification program in the storage device on termination of execution of the processing program, when the storage device is attached to the image processing apparatus during execution of the processing program.

7. The image processing apparatus according to claim 1, wherein a communication session is established between a web browser of the external terminal and a web server of the image processing apparatus.

8. The image processing apparatus according to claim 1, wherein the first, second, and third storage areas are different from each other.

9. A computer-implemented method,
the computer including a first storage area configured to store firmware including a processing program for communication processing with an external terminal,
the method comprising:
reading out the firmware including the processing program from the first storage area to a third storage area and executing the read firmware;
the executing including receiving a login request from the external terminal to establish a communication session, wherein the login request is received during execution of the firmware;
starting execution of the processing program in response to the login request;
receiving a modification program and storing the modification program into a second storage area when the modification program is received during execution of the processing program, the modification program being a modified program of at least a partial program in the processing program;
associating an address in the second storage area at which the modification program is stored with an address in the third storage area of the processing program;
executing the modified program stored at the address in the second storage area associated with the address in the third storage area to which the processing program is read out, in place of the processing program;
terminating execution of the processing program when a logout request to terminate the communication session is received; and
rewriting the processing program in the first storage area using the modification program in the second storage area when execution of the processing program is terminated in response to the received logout request to terminate.

10. The method according to claim 9,
wherein the modified program is executed, in place of the partial program, when the partial program in the processing program is executed.

11. The method according to claim 9, wherein the modification program is supplied from a server that distributes the modification program, wherein
the method further comprising receiving the modification program from the server in response to receiving a request from the server.

12. The method according to claim 11, wherein
the external terminal is capable of communicating with the server, wherein
the method further comprising receiving the modification program from the server via the external terminal.

13. The method according to claim 12, further comprising:
acquiring timing information indicating a timing when updating of the firmware is scheduled; and
prohibiting reception of the modification program from the server via the external terminal when the timing information indicates latest schedule.

14. The method according to claim 9, wherein
the second storage area includes a area within a storage device detachable from the computer and capable of storing the processing program, wherein
the method further comprising:
rewriting the processing program in the first storage area using the modification program in the storage device on termination of execution of the processing program, when the storage device is attached to the computer during execution of the processing program.

15. A non-transitory computer-readable storage medium storing a program for causing a computer to execute a method,
the computer including a first storage area configured to store firmware including a processing program for communication processing with an external terminal and a third storage area,
the method comprising:
reading out the firmware including the processing program from the first storage area to the third storage area and executing the read firmware;
the executing including receiving a login request from the external terminal to establish a communication session, wherein the login request is received during execution of the firmware;
starting execution of the processing program in response to the login request;
receiving a modification program and storing the modification program into a second storage area when the modification program is received during execution of the processing program, the modification program being a modified program of at least a partial program in the processing program;
associating an address in the second storage area at which the modification program is stored with an address in the third storage area of the processing program;
executing the modified program stored at the address in the second storage area associated with the address in the third storage area to which the processing program is read out, in place of the processing program;
terminating execution of the processing program when a logout request to terminate the communication session is received; and
rewriting the processing program in the first storage area using the modification program in the second storage area when execution of the processing program is terminated in response to the received logout request to terminate.

16. The computer-readable storage medium according to claim 15, and wherein the modified program is executed, in place of the partial program, when the partial program in the processing program is executed.

17. The computer-readable storage medium according to claim 15, wherein the modification program is supplied from a server that distributes the modification program, the method further comprising receiving the modification program from the server in response to receiving a request from the server.

18. The computer-readable storage medium according to claim 17, wherein the external terminal is capable of communicating with the server, the method further comprising receiving the modification program from the server via the external terminal.

19. The computer-readable storage medium according to claim 18, wherein the method further comprising:

acquiring timing information indicating a timing when updating of the firmware is scheduled; and prohibiting reception of the modification program from the server via the external terminal when the timing information indicates latest schedule.

20. The computer-readable storage medium according to claim 15, wherein the second storage area includes a area within a storage device detachable from the computer and capable of storing the processing program, the method further comprising rewriting the processing program in the first storage area using the modification program in the storage device on termination of execution of the processing program, when the storage device is attached to the computer during execution of the processing program.

* * * * *